US007188346B2

(12) United States Patent
Martin et al.

(10) Patent No.: US 7,188,346 B2
(45) Date of Patent: Mar. 6, 2007

(54) METHOD, SYSTEM AND PROGRAM PRODUCT FOR CORRELATING DATA BETWEEN OPERATING ENVIRONMENTS

(75) Inventors: Steven J Martin, Poughkeepsie, NY (US); Michael J Miele, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 10/998,889

(22) Filed: Nov. 29, 2004

(65) Prior Publication Data
US 2006/0130071 A1 Jun. 15, 2006

(51) Int. Cl.
*G06F 9/46* (2006.01)
(52) U.S. Cl. .................... 719/318; 714/25; 714/31; 714/48
(58) Field of Classification Search .................. 707/8, 707/201; 714/25, 31, 2, 26, 47–49; 719/318
See application file for complete search history.

(56) References Cited

U.S. PATENT DOCUMENTS

| 5,111,384 | A | * | 5/1992 | Aslanian et al. ............. 714/26 |
| 5,220,567 | A | | 6/1993 | Dooley et al. ............. 371/5.1 |
| 5,463,768 | A | * | 10/1995 | Cuddihy et al. ............. 714/37 |
| 5,712,972 | A | * | 1/1998 | Kakkar ........................ 714/26 |
| 6,119,246 | A | * | 9/2000 | McLaughlin et al. ......... 714/27 |
| 6,351,494 | B1 | | 2/2002 | Kondo et al. ........... 375/240.27 |
| 6,636,981 | B1 | | 10/2003 | Barnett et al. ................. 714/4 |
| 6,704,888 | B1 | * | 3/2004 | Caudrelier et al. ........... 714/37 |
| 2005/0216720 | A1 | * | 9/2005 | Michaelis et al. ............. 713/2 |

OTHER PUBLICATIONS

"Multivariate Analysis Of Data Samples With Self-Estimation Of Errors," R. Bandiera; Bulletin d'Information du Centre de Donnees Stellaires; No. 36; pp. 187-191; 1989.
"Using Constrained Models For Guaranteed-Error Semantic Compression," S. Babu, M. Garofalakis, R. Rastogi; SIGKDD Explorations, vol. 4, Issue 1—pp. 11-20.
"A Model-Based Semantic Compression System For Massive Data Tables," S. Babu, M. Garofalakis, R. Rastogi; ACM SIGMOD 2001, May 21-24, Santa Barbara, California, USA; pp. 283-294.

(Continued)

*Primary Examiner*—William Thomson
*Assistant Examiner*—Charles Anya
(74) *Attorney, Agent, or Firm*—Lawrence D. Cutter, Esq.; Kevin P. Radigan, Esq.; Heslin Rothenberg Farley & Mesiti, P.C.

(57) ABSTRACT

A data correlation technique is provided for a computing environment having multiple independent operating environments. The technique includes associating by a first operating environment a first key to a set of data to be obtained responsive to an identified event within the computing environment; obtaining by a second operating environment the set of data with the associated first key, and associating a second key therewith; and using the set of data with the associated first key and second key to match to the set of data at least one other set of data obtained by the first operating environment or the second operating environment responsive to the event. The at least one other set of data has only the first key or the second key associated therewith. In one implementation, the event is a fatal event at a network interface adapter.

26 Claims, 6 Drawing Sheets

OTHER PUBLICATIONS

"A Model For The Performance Evaluation Of Packet Transmissions Using Type-II Hybrid ARQ Over A Correlated Error Channel," R. Mukhtar, S. Hanly, M. Zukerman, F. Cameron; Wireless Networks 10, 2004; pp. 7-16.

* cited by examiner

METHOD, SYSTEM AND PROGRAM PRODUCT FOR CORRELATING DATA BETWEEN OPERATING ENVIRONMENTS

TECHNICAL FIELD

The present invention relates to an improved processing system, and more particularly, to a method, system and program product for correlating asynchronously obtained data between independent operating environments of a computing environment.

BACKGROUND OF THE INVENTION

Logical partitioning allows for the establishment of a plurality of system images within a single physical machine or central processor complex (CPC). Each system image is capable of operating as if it was a separate computer system. That is, each logical partition can be independently reset, initially loaded with an operating system that may be different for each logical partition, and operate with different software programs using different input/output (I/O) devices.

Examples of logically partitioned computing systems are described in, for instance, Guyette et al., U.S. Pat. No. 4,564,903, entitled "Partitioned Multiprocessor Programming System," issued Jan. 14, 1996; Bean et al., U.S. Pat. No. 4,843,541, entitled "Logical Resource Partitioning of a Data Processing System," issued Jun. 27, 1989; and Kubala, U.S. Pat. No. 5,564,040, entitled "Method and Apparatus for Providing a Server Function in a Logically Partitioned Hardware Machine," issued Oct. 8, 1996, each of which is hereby incorporated herein by reference in its entirety.

SUMMARY OF THE INVENTION

In one example, a computing environment may comprise one or more central processing complexes, with an independent service processor being employed for configuration and error handling responsibilities within the computing environment. In such an environment, wherein there are multiple operating environments, multiple sets of data may be required for certain events to be diagnosed properly. Each set of data may be collected and stored within the computing environment in response to an event such as a fatal error event. A technique is thus required to correlate separate sets of data obtained, for example, by a host operating environment and the service processor, which in one embodiment, do not communicate directly, but rather only via a firmware layer supporting the host operating environment.

The shortcomings of the prior art are overcome and additional advantages are provided through the provision of a method of correlating data between independent operating environments of a computing environment. The method includes: identifying an event; responsive to the identifying of the event, associating by a first operating environment a first key to a set of data to be obtained responsive to the event; obtaining by a second operating environment the set of data with the associated first key, and associating a second key therewith; and using the set of data with the associated first key and second key to match thereto at least one other set of data obtained by the first operating environment or the second operating environment responsive to the event, the at least one other set of data having only the first key or the second key associated therewith.

In enhanced aspects, the set of data and the at least one other set of data are obtained asynchronously by at least one of the first operating environment and the second operating environment. The computing environment may include a network interface adapter, and the first operating environment may be a service processor for the computing environment, and the second operating environment a host operating environment which employs the network interface adapter. Within such a computing environment, the service processor is assumed to communicate with a firmware layer of the computing environment supporting the host operating environment. In addition, as one example, the event may comprise a failure event received or identified at the network interface adapter.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Reference is now made to the drawings, wherein the same reference numbers used throughout different figures designate the same or similar components. Although described herein with reference to a fatal error or fatal event, those skilled in the art will understand that the data correlation concepts presented are applicable to other activation events wherein multiple asynchronously generated sets of data need to be correlated between operating environments which do not communicate directly.

Figure 1:
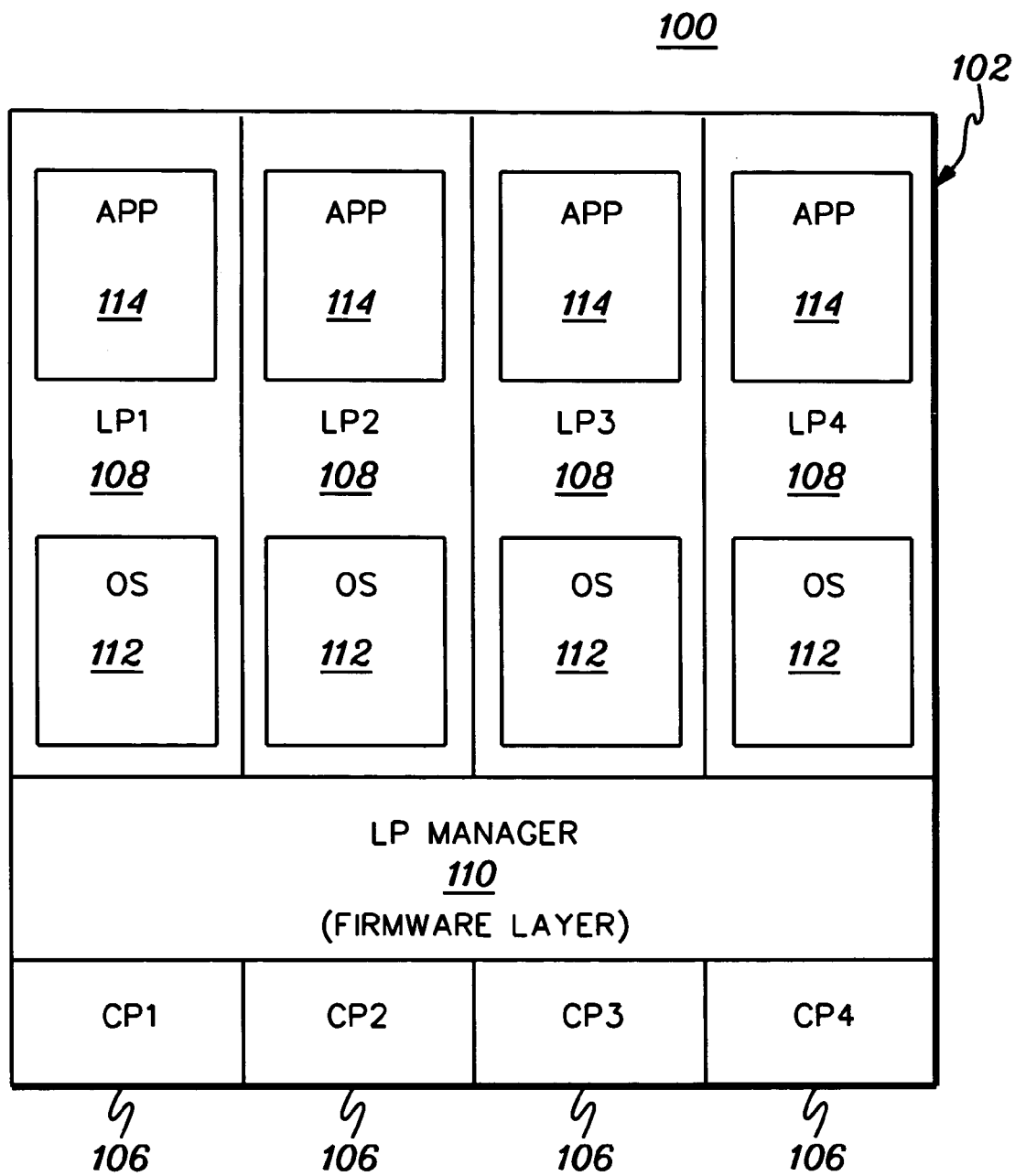
FIG. 1 depicts one embodiment of a computing environment to incorporate and use data correlation capabilities in accordance with an aspect of the present invention.

One embodiment of a computing environment, generally denoted 100, incorporating and using the data correlation capabilities of the present invention is depicted in FIG. 1. Computing environment 100 is based, for instance, on the eServer pSeries 690 system offered by International Business Machines Corporation, Armonk, N.Y. The pSeries 690 is described in an IBM publication entitled "IBM eServer pSeries 690 User's Guide," IBM Publication No. SA38-0588, February 2004, which is hereby incorporated herein by reference in its entirety.

Computing environment 100 includes, for example, a central processor complex (CPC) 102 having one or more central processors 106 (e.g., CP1–CP4), one or more partitions 108 (e.g., logical partitions (LP1–LP4)), and at least one logical partition manager 110, each of which is described below.

Central processors 106 are physical processor resources that are allocated to the logical partitions. In particular, each logical partition 108 has one or more logical processors (not separately shown for clarity), each of which represents all or a share of a physical processor 106 allocated to the partition. The logical processors of a particular partition 108 may be either dedicated to the partition (so that the underlying processor resource 106 is reserved for that partition) or shared with another partition (so that the underlying processor resource is potentially available to another partition).

In the particular example shown, each logical partition LP1–LP4 functions as a separate system having a resident operating system 112 (which may differ for each logical partition) and one or more applications 114. In one embodiment, operating system 112 is an AIX 5L™, OS/390™, or MVS/ESA™ operating system offered by International Business Machines Corporation, or a LINUX operating system.

Logical partitions 108 are managed by logical partition manager 110 implemented by code running on processors 106. Logical partitions 108 (LP1–LP4) and logical partition manager 110 each comprise one or more programs residing in respective portions of central storage associated with the central processor. One example of logical partition manager 110 is PR/SM.

In a computing environment where there are multiple operating environments, multiple sets of data may be required for certain types of events to be diagnosed properly. For example, sets of data may be asynchronously collected and stored on a host operating environment (e.g., a logical partition) responsive to an event such as a fatal error event or other failure. One set of data may be obtained from a network interface adapter by a service processor of the computing environment, while one or more other sets of data may be obtained by the host operating environment responsive to the event. Presented herein is a technique for correlating these sets of data. This technique is implemented using existing information provided by the service processor of the computing environment, and assumes that the service processor does not communicate directly with the host operating environment. The solution disclosed employs unique keys associated with the different sets of data to correlate the sets of data.

Figure 2:
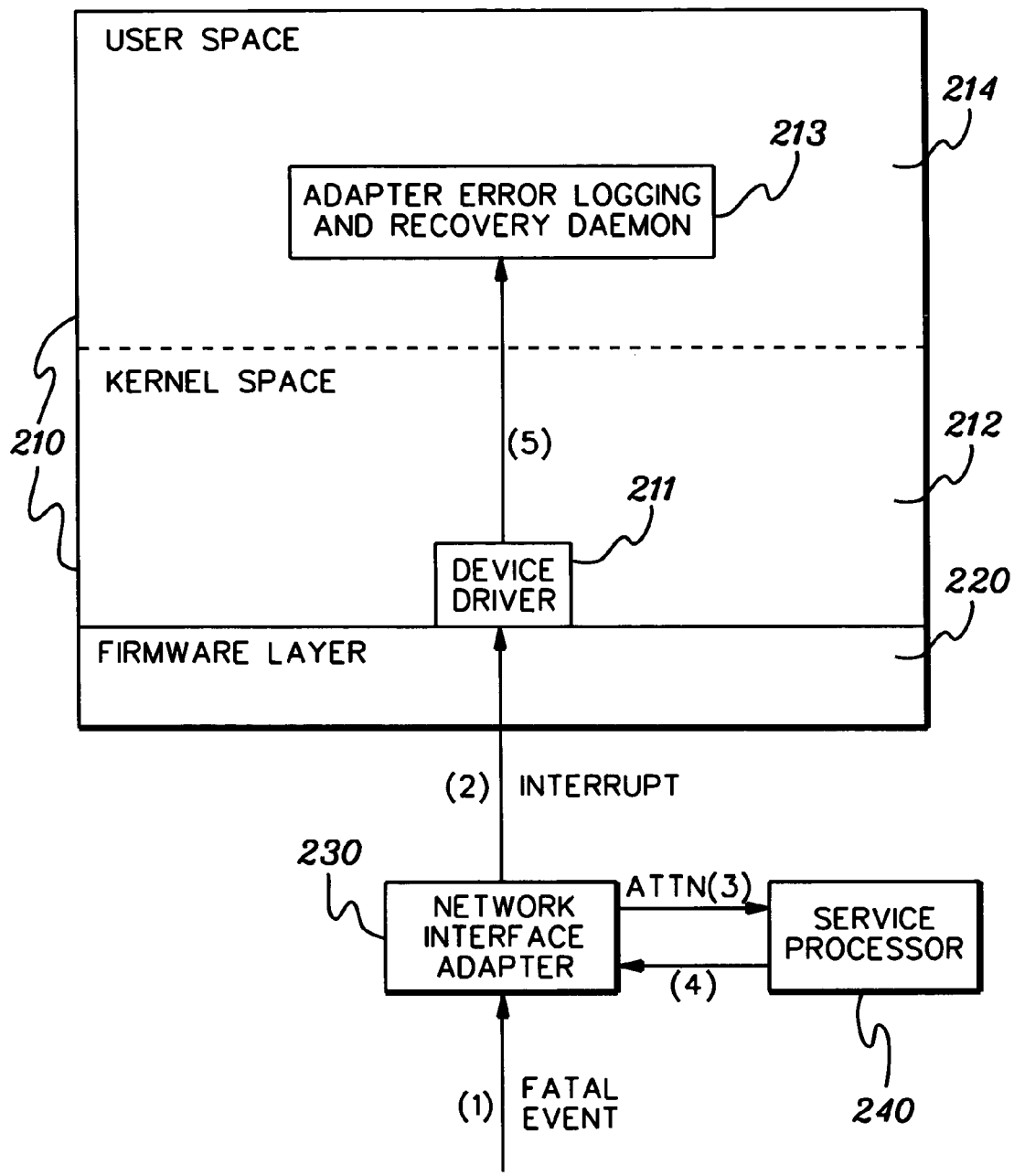
FIG. 2 is a more detailed embodiment of a computing environment incorporating and using the data correlation capabilities of the present invention, and showing receipt of a fatal event at a network interface adapter and sending notification thereof to a service processor of the computing environment and to an adapter error logging and recovery daemon of a host operating environment employing the network interface adapter, in accordance with an aspect of the present invention.

FIG. 2 depicts one embodiment of a computing environment 200 wherein a host operating environment 210, comprising kernel space 212 and user space 214 communicates across a firmware layer 220 with a network interface adapter 230. As one example, firmware layer 220 comprises a hypervisor layer or domain which is a privileged layer of software that owns the hardware of the CPC. A service processor 240 provides, for example, configuration and error handling responsibilities within computing environment 200. In one implementation, there is a single service processor 240 for the computing environment 200, while host operating environment 210 may comprise one partition of multiple logical partitions of the computing environment. Processor 240 is assumed to have its own operating system, which comprises a different operating environment then the host operating environment 210.

As shown in FIG. 2, a fatal event (1) is assumed to be received at network interface adapter 230. This causes the adapter to register an error, and responsive to this event, hardware logic of the adapter sends an interrupt signal (2) to the device driver instance 211 running in kernel space 212 of the host operating environment 210 owning the adapter. Additionally, an attention signal (3) is driven from the network interface adapter to the service processor 240 informing the service processor of the fatal event. Responsive to this attention signal, the service processor 240 harvests or reads out (4) a set of data from registers on the network interface adapter 230. The data read by the service processor, in one example, contains the values of a set of registers on the adapter at the time of the event. The contents of these registers dictate the action taken by the service processor. This set of data may not be available elsewhere. Again, assuming that the event is a fatal event, the service processor associates a first key (key1) with the obtained set of data, for example, as a file name. Commensurate with this data retrieval, device driver 211 sends an error signal (5) to an adapter error logging and recovery daemon 213 running in user space 214 of the host operating environment 210. This daemon 213 is assumed to comprise a reliable daemon.

Figure 3:
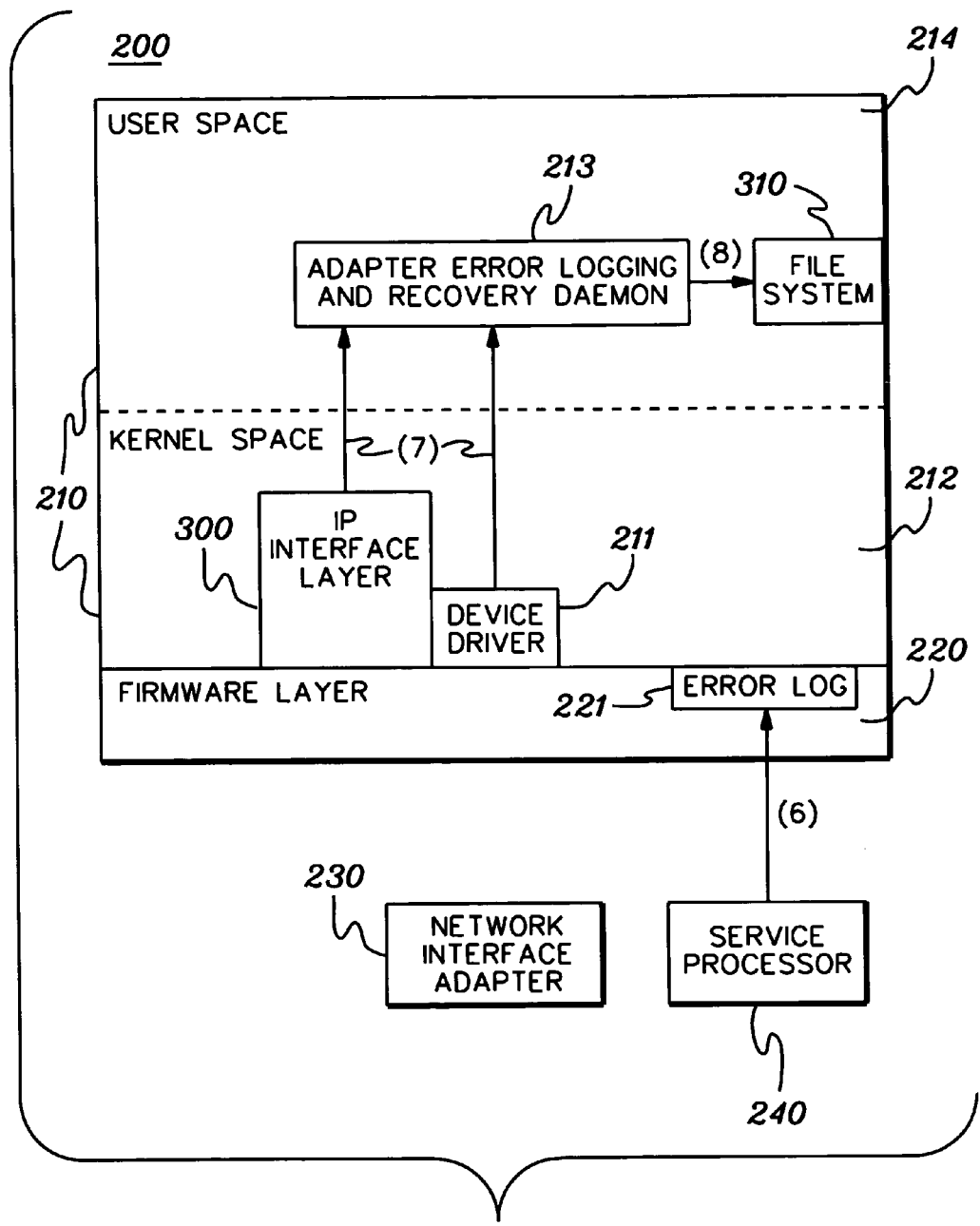
FIG. 3 depicts the computing environment of FIG. 2, showing the service provider logging a set of data obtained responsive to the event to a firmware layer of the computing environment, and the generation and saving of another set of data (i.e., a snapshot file) responsive to the event by the adapter error logging and recovery daemon of the host operating environment, in accordance with an aspect of the present invention.

As shown in FIG. 3, service provider 240 forwards (6) the set of data with the first key associated therewith to firmware layer 220 of the computing environment 200 for logging in an error log 221, from which the data will be subsequently collected by the host operating environment 210 (see FIG. 5). Asynchronously, the adapter error logging and recovery daemon 213 collects another set of data (7) from, for example, device driver 211 and an IP interface layer 300. This set of data (7) may be a snapshot set of data of the current operating system environment and, may include, for example, a list of running processes, and general data such as installed software, network interface data, etc., at the time of receipt of the event. A second key (key2) is associated with this set of data (7) by the adapter error logging and recovery daemon 213 and stored (8) in a file system 310 of the host operating environment 210. At this time, there is one set of data which was collected by the service processor responsive to the event saved in error log 221 of the firmware layer, and which has associated therewith the first key assigned by the service processor, and another set of data stored in the file system 310 by the adapter error logging and recovery daemon 213 in response to the event, which has associated therewith the second key assigned by the daemon 213.

Figure 4:
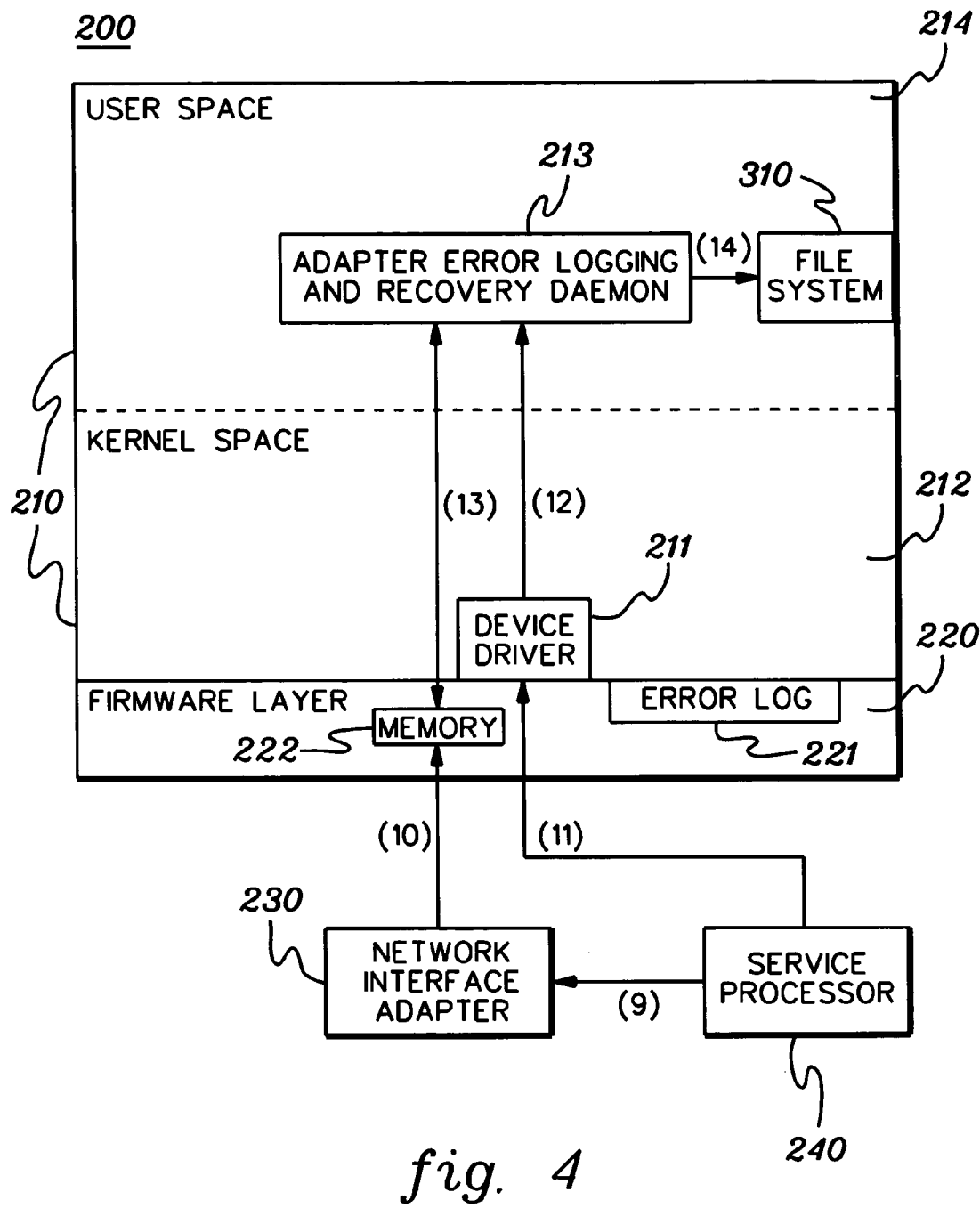
FIG. 4 depicts the computing environment of FIGS. 2 & 3, illustrating the service provider initially associating a first key with a dump set of data subsequently obtained and labeled by the second computing environment with a second key, and then saved as a dump file, in accordance with an aspect of the present invention.

FIG. 4 depict generation of still another set of data responsive to the event. This set of data is referred to as a dump set of data or dump file. Action is initiated by the service processor 240 instructing (9) logic of the network interface adapter 230 to dump its internal data and to associate key1 with the dumped set of data. Adapter 230 then dumps (10) this set of internal data with key1 associated therewith into firmware layer memory 220. In one implementation, the dump set of data may include: the microcode revision, hardware error register values, microcode state data, hardware trace array data, and microcode trace data. Service processor 240 monitors the dump process by the adapter and when completed, sends an interrupt signal (11) to the device driver instance 211 in kernel space 212 of the host operating environment 210. Device driver 211 then signals (12) adapter error logging and recovery daemon 213 that a dump set of data is available in memory 222 of firmware layer 220. Reliable daemon 213 calls into the kernel space 212 to collect the dumped set of data from memory 222 of firmware layer 220, associates key2 with this dumped set of data, and stores (14) the dump set of data with associated key2 as a dump file in file system 310. Daemon 213 knows to label the dump set of data with key2 because, from the perspective of daemon 213, there is a synchronous series of events from the fatal event notification it received from the device driver to when the daemon sees that there is a dump set of data available. Thus, the daemon knows to relate that dump set of data to the prior fatal event and to employ the same key2 as used in connection with the snapshot set of data. That is, after a fatal event, the computing environment assumes that the network interface adapter will provide a dump set of data to the host operating environment.

Figure 5:
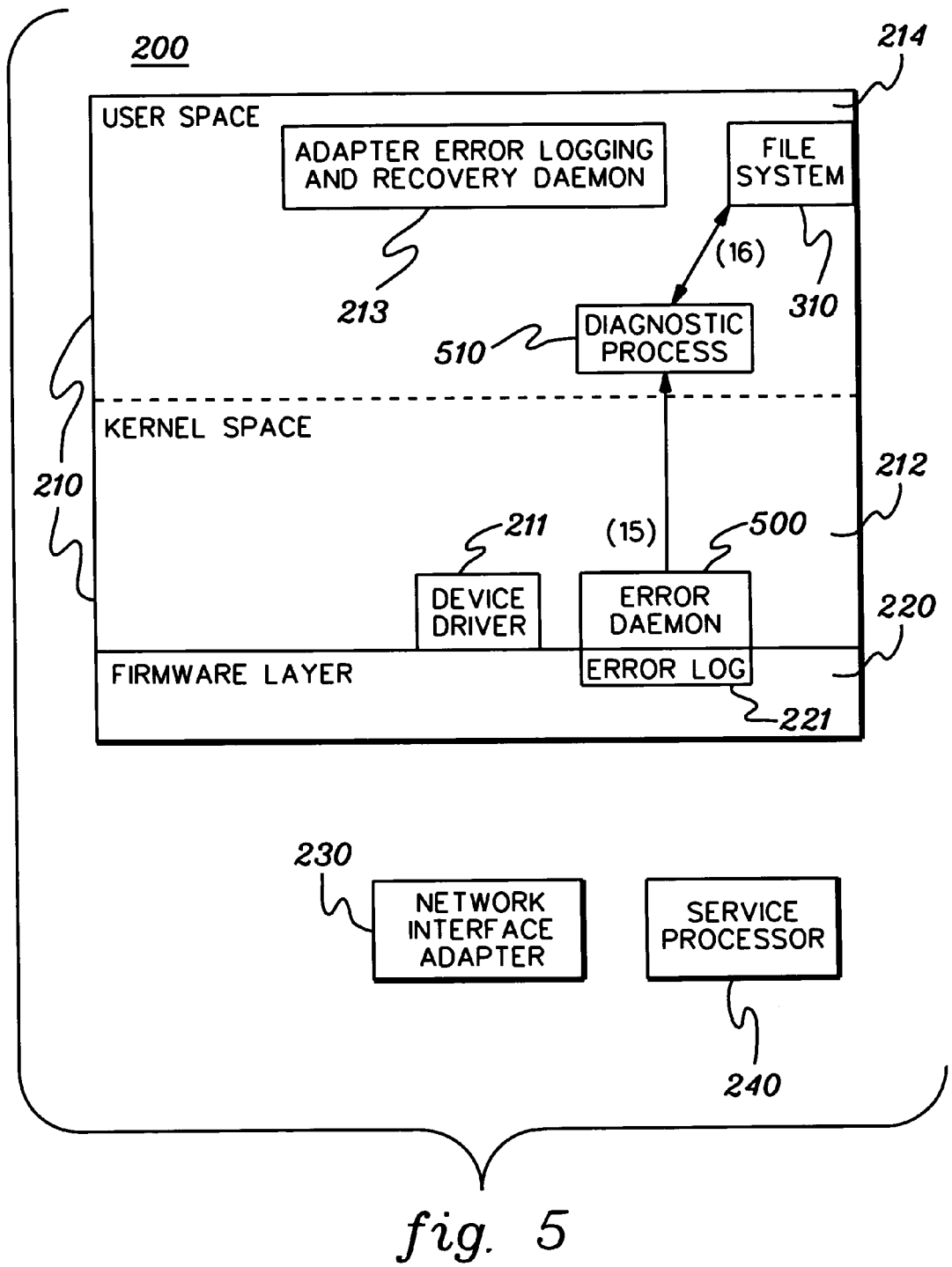
FIG. 5 depicts the computing environment of FIGS. 2–4, showing the retrieval of the logged set of data from firmware and the employing of a diagnostic process to correlate the logged data, the snapshot file and the dump file, in accordance with an aspect of the present invention.

As shown in FIG. 5, the logged set of data generated by service processor 240 and held in error log 221 is subsequently extracted by an error daemon 500 running in kernel space 212 of the host operating environment. This is accomplished by calling into the firmware layer to determine whether any new data has been logged. Assuming that the event was a fatal event, then error daemon 500 invokes (15) a diagnostics process 510 to evaluate the logged set of data, the snapshot set of data and dump set of data and correlate (16) the three sets of data.

Figure 6:
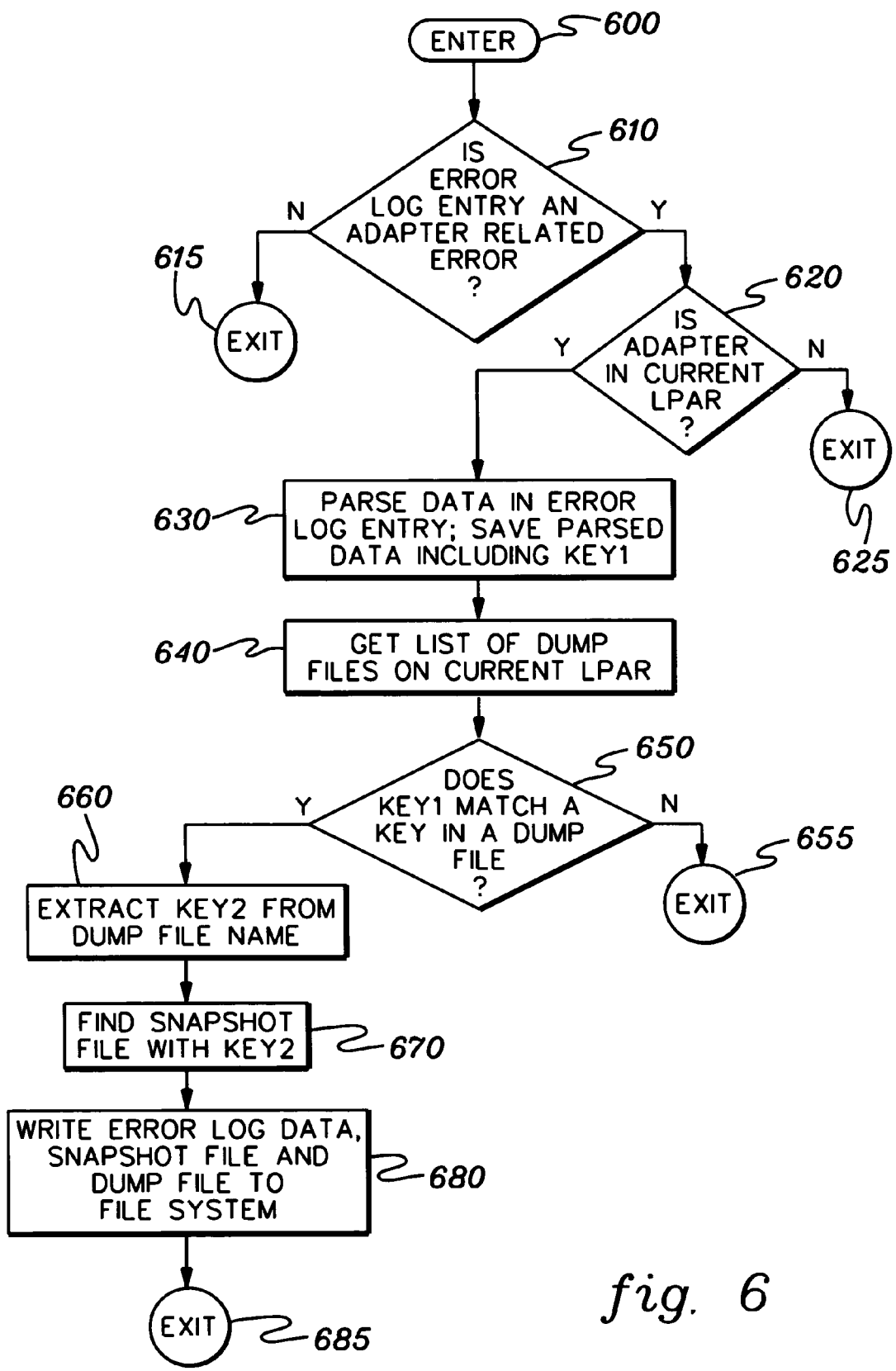
FIG. 6 is a flowchart of one embodiment of a diagnostic process for correlating the logged data, snapshot file and dump file, in accordance with an aspect of the present invention.

FIG. 6 is a flowchart of one embodiment of a diagnostic process for using the associated key1 and key2 of the various sets of data to correlate the sets of data, in accordance with an aspect of the present invention. This correlation processing begins 600 with input of an error log entry or sequence number, and initially determines whether the retrieved error log entry is an adapter related error 610. If "no", then processing exits 615. By looking inside the error log entry, the diagnostics routine can determine whether the entry was produced by a network interface adapter. If so, then processing determines whether the adapter belongs to the current logical partition 620. In one computing environment implementation having multiple LPARs, all error log entries are assumed to go to all LPARs. Only the host operating environment or LPAR that owns the network interface adapter at issue needs to process the information. If the adapter belongs to another LPAR, then the diagnostics process for the particular operating environment is exited 625.

Assuming that the error log entry is an adapter related error and that the adapter is owned by the current operating environment, then the processing parses the data in the error log entry and saves the parsed data including key1 630. Processing then, using the preset naming convention, obtains a listing of all dump files saved in the file system of the current operating environment 640, and opens the dump files and determines whether key1 matches a key found in any dump file on the list 650. If "no", then the diagnostics process is exited 655 since a correlation can not be obtained. Assuming that a dump file or dump set of data is matched using key1, then the diagnostics processing extracts key2 from the dump file name 660. Processing then finds the snapshot file or snapshot set of data also having key2 associated therewith, for example, in its file name 670. The snapshot file may be in a different directory structure of the current operating environment than the dump file. At this point, the diagnostic process has correlated the error log data, snapshot file and dump file using key1 and key2 and writes the correlated data to the file system 680 before exiting 685.

By way of example, key1 could comprise an event timestamp established by the service processor. Key2 could comprise a value established by the host operating environment when initializing, and is a value unique for each adapter employed by the host operating environment. For example, at initialization, key2 could be established as the UNIX time in seconds plus the logical adapter number of the network interface adapter, that is, (((int)time_now.tv_sec)<8 & 0x7ffffff)+(minor_number<<8). This would ensure a large number of unique key2 values per adapter. The key2 value can be converted to a string of hex digits and used as part of the filename for the snapshot file and the file name for the dump file as explained above.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of correlating data between independent operating environments of a computing environment, the method comprising:
   identifying a failure event;
   responsive to the identifying of the event, associating by a first operating environment a first key to a set of data to be obtained responsive to the event;
   subsequent to the associating by the first operating environment the first key to the set of data to be obtained responsive to the event, obtaining by a second operating environment the set of data with the associated first key, and associating a second key therewith by the second operating environment, wherein associated with the set of data is the first key associated by the first operating environment and the second key associated by the second operating environment; and using the set of data with the associated first key and second key to correlate thereto at least one other set of data obtained by the first operating environment or the second operating environment responsive to the failure event, the at least one other set of data having only the first key or the second key associated therewith.

2. The method of claim 1, wherein the set of data and the at least one other set of data are obtained asynchronously by at least one of the first operating environment and the second operating environment.

3. The method of claim 1, wherein the associating of the first key to the set of data comprises embedding the first key within the set of data, and wherein the associating of the second key with the set of data having the embedded first key comprises labeling the set of data with the embedded first key with a file name comprising the second key.

4. The method of claim 1, wherein the set of data comprises a dump set of data, and the first operating environment initiates the obtaining of the dump set of data by the second operating environment, and wherein data of the dump set of data is obtained from other than the first operating environment and the second operating environment.

5. The method of claim 4, wherein data of the dump set of data is obtained from a network interface adapter, and wherein the first operating environment comprises a service processor for the computing environment and the second operating environment comprises a host operating environment employing the network interface adapter.

6. The method of claim 1, wherein the at least one other set of data comprises at least two other sets of data, a first other set of data having only the first key associated therewith, and a second other set of data having only the second key associated therewith, and wherein the first other set of data is obtained by the first operating environment and the second other set of data is obtained by the second operating environment, the first operating environment providing the first other set of data to the second operating environment, and wherein the second operating environment uses the set of data with the associated first key and second key to match the set of data, the first other set of data and the second other set of data.

7. The method of claim 6, wherein the computing environment comprises a network interface adapter, the first operating environment comprises a service processor for the computing environment and the second operating environment comprises a host operating environment which employs the network interface adapter, the service processor communicating with a firmware layer of the computing environment supporting the host operating environment, and wherein the first other set of data is provided to the firmware layer by the service processor and is obtained from the firmware layer by the host operating environment, and wherein the set of data and the second other set of data are stored in a file system associated with the host operating environment.

8. The method of claim 7, further comprising parsing the set of data by the host operating environment to obtain the first key and the second key and employing the first key and the second key to match the set of data, the first other set of data and the second other set of data.

9. A system for correlating data between independent operating environments of a computing environment, the system comprising:

means for associating by a first operating environment a first key to a set of data to be obtained responsive to identifying of a failure event within the computing environment;

means for obtaining, subsecuent to the associating by the first operating environment the first key to the set of data to be obtained responsive to the event, by a second operating environment the set of data with the associated first key, and for associating a second key therewith by the second operating environment, wherein associated with the set of data is the first key associated by the first operating environment and the second key associated by the second operating environment; and means for using the set of data with the associated first key and second key to correlate thereto at least one other set of data obtained by the first operating environment or the second operating environment responsive to the failure event, the at least one other set of data having only the first key or the second key associated therewith.

10. The system of claim 9, wherein the set of data and the at least one other set of data are obtained asynchronously by at least one of the first operating environment and the second operating environment.

11. The system of claim 9, wherein the means for associating the first key to the set of data comprises means for embedding the first key within the set of data, and wherein the means for associating the second key with the set of data having the embedded first key comprises means for labeling the set of data with the embedded first key with a file name comprising the second key.

12. The system of claim 9, wherein the set of data comprises a dump set of data, and the first operating environment initiates the means for obtaining of the dump set of data by the second operating environment, and wherein data of the dump set of data is obtained from other than the first operating environment and the second operating environment.

13. The system of claim 12, wherein data of the dump set of data is obtained from a network interface adapter, and wherein the first operating environment comprises a service processor for the computing environment and the second operating environment comprises a host operating environment employing the network interface adapter.

14. The system of claim 9, wherein the at least one other set of data comprises at least two other sets of data, a first other set of data having only the first key associated therewith, and a second other set of data having only the second key associated therewith, and wherein the first other set of data is obtained by the first operating environment and the second other set of data is obtained by the second operating environment, the first operating environment providing the first other set of data to the second operating environment, and wherein the second operating environment uses the set of data with the associated first key and second key to match the set of data, the first other set of data and the second other set of data.

15. The system of claim 14, wherein the computing environment comprises a network interface adapter, the first operating environment comprises a service processor for the computing environment and the second operating environment comprises a host operating environment which employs the network interface adapter, the service processor communicating with a firmware layer of the computing environment supporting the host operating environment, and wherein the first other set of data is provided to the finnware layer by the service processor and is obtained from the firmware layer by the host operating environment, and wherein the set of data and the second other set of data are stored in a file system associated with the host operating environment.

16. The system of claim 15, further comprising means for parsing the set of data by the host operating environment to obtain the first key and the second key and for employing the first key and the second key to match the set of data, the first other set of data and the second other set of data.

17. A system comprising:
a first operating environment of a computing environment, the first operating environment being adapted to associate a first key to a set of data to be obtained responsive to identifying of a failure event within the computing environment;
a second operating environment of the computing environment, the second operating environment being adapted to obtain, subsequent to the associating by the first operating environment the first key to the set of data to be obtained response to the event, the set of data with the associated first key responsive to the event, and to associate a second key therewith, wherein associated with the set of data is the first key associated by the first operating environment and the second key associated by the second operating environment; and
wherein one of the first operating environment and the second operating environment is adapted to employ the set of data with the associated first key and second key to correlate thereto at least one other set of data obtained by the first operating environment or the second operating environment responsive to the failure event, the at least one other set of data having only the first key or the second key associated therewith.

18. The system of claim 17, wherein the computing environment comprises a network interface adapter, the first operating environment comprises a service processor for the computing environment and the second operating environment comprises a host operating environment which employs the network interface adapter, the service processor communicating with a firmware layer of the computing environment supporting the host operating environment, and wherein the set of data and the at least one other set of data are obtained asynchronously by at least one of the service processor and the host operating environment.

19. At least one program storage device readable by a machine embodying at least one program of instructions executable by the machine to perform a method of correlating data between independent operating environments of a computing environment, the method comprising:
identifying a failure event;
responsive to the identifying of the event, associating by a first operating environment a first key to a set of data to be obtained responsive to the event;
subseciuent to the associating by the first operating environment the first key to the set of data to be obtained responsive to the event, obtaining by a second operating environment the set of data with the associated first key, and associating a second key therewith by the second operating environment, wherein associated with the set of data is the first key associated by the first operating environment and the second key associated by the second operating environment; and
using the set of data with the associated first key and second key to correlate thereto at least one other set of data obtained by the first operating environment or the second operating environment responsive to the failure event, the at least one other set of data having only the first key or the second key associated therewith.

20. The at least one program storage device of claim 19, wherein the set of data and the at least one other set of data are obtained asynchronously by at least one of the first operating environment and the second operating environment.

21. The at least one program storage device of claim 19, wherein the associating of the first key to the set of data comprises embedding the first key within the set of data, and wherein the associating of the second key with the set of data having the embedded first key comprises labeling the set of data with the embedded first key with a file name comprising the second key.

22. The at least one program storage device of claim 19, wherein the set of data comprises a dump set of data, and the first operating environment initiates the obtaining of the dump set of data by the second operating environment, and wherein data of the dump set of data is obtained from other than the first operating environment and the second operating environment.

23. The at least one program storage device of claim 22, wherein data of the dump set of data is obtained from a network interface adapter, and wherein the first operating environment comprises a service processor for the computing environment and the second operating environment comprises a host operating environment employing the network interface adapter.

24. The at least one program storage device of claim 19, wherein the at least one other set of data comprises at least two other sets of data, a first other set of data having only the first key associated therewith, and a second other set of data having only the second key associated therewith, and wherein the first other set of data is obtained by the first operating environment and the second other set of data is obtained by the second operating environment, the first operating environment providing the first other set of data to the second operating environment, and wherein the second operating environment uses the set of data with the associated first key and second key to match the set of data, the first other set of data and the second other set of data.

25. The at least one program storage device of claim 24, wherein the computing environment comprises a network interface adapter, the first operating environment comprises a service processor for the computing environment and the second operating environment comprises a host operating environment which employs the network interface adapter, the service processor communicating with a firmware layer of the computing environment supporting the host operating environment, and wherein the first other set of data is provided to the firmware layer by the service processor and is obtained from the firmware layer by the host operating environment, and wherein the set of data and the second other set of data are stored in a file system associated with the host operating environment.

26. The at least one program storage device of claim 25, further comprising parsing the set of data by the host operating environment to obtain the first key and the second key and employing the first key and the second key to match the set of data, the first other set of data and the second other set of data.

* * * * *